US012104349B2

(12) United States Patent
Hiraku et al.

(10) Patent No.: US 12,104,349 B2
(45) Date of Patent: Oct. 1, 2024

(54) CONSTRUCTION MACHINE

(71) Applicant: Hitachi Construction Machinery Co., Ltd., Tokyo (JP)

(72) Inventors: Kenji Hiraku, Kasumigaura (JP); Akira Nakayama, Tsuchiura (JP); Teppei Saitoh, Mito (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 425 days.

(21) Appl. No.: 17/637,726

(22) PCT Filed: Oct. 6, 2020

(86) PCT No.: PCT/JP2020/037923
§ 371 (c)(1),
(2) Date: Feb. 23, 2022

(87) PCT Pub. No.: WO2021/090627
PCT Pub. Date: May 14, 2021

(65) Prior Publication Data
US 2022/0282448 A1 Sep. 8, 2022

(30) Foreign Application Priority Data
Nov. 7, 2019 (JP) ................................ 2019-202551

(51) Int. Cl.
*E02F 9/22* (2006.01)
*E02F 3/32* (2006.01)
(Continued)

(52) U.S. Cl.
CPC ................ *E02F 3/425* (2013.01); *E02F 3/32* (2013.01); *E02F 9/2004* (2013.01);
(Continued)

(58) Field of Classification Search
CPC ..... E02F 9/2292; E02F 9/2289; E02F 9/2275; E02F 9/2271; E02F 9/2267; E02F 9/2242; E02F 9/2004; E02F 9/2296; F15B 21/00
See application file for complete search history.

(56) References Cited

U.S. PATENT DOCUMENTS

2016/0032565 A1 2/2016 Shimizu et al.
2016/0333903 A1* 11/2016 Peterson ............... E02F 9/2217

FOREIGN PATENT DOCUMENTS

JP 58-144104 U 9/1983
JP 59-40602 U 3/1984
(Continued)

OTHER PUBLICATIONS

International Search Report (PCT/ISA/210) issued in PCT Application No. PCT/JP2020/037923 dated Dec. 22, 2020 with English translation (four (4) pages).
(Continued)

*Primary Examiner* — Kenneth Bomberg
*Assistant Examiner* — Daniel S Collins
(74) *Attorney, Agent, or Firm* — Crowell & Moring LLP

(57) ABSTRACT

Provided is a construction machine configured such that a hydraulic actuator is driven by a hydraulic pump for a closed circuit, by which oil film breakage of the hydraulic pump for a closed circuit is prevented to improve the reliability and a high operation rate can be obtained. The construction machine includes a switching valve that is provided in a branch hydraulic line connecting one of suction/delivery ports of a closed circuit pump and a charge line to each other and is opened and closed according to a control signal from a controller. The controller is configured to, in a case where a state in which a delivery volume of the closed circuit pump is kept to zero continues for a predetermined time period or more, open the switching valve and keep the delivery volume of the closed circuit pump to a predetermined
(Continued)

delivery volume or more, the predetermined delivery volume being greater than zero.

4 Claims, 7 Drawing Sheets

(51) Int. Cl.

| | |
|---|---|
| ***E02F 3/42*** | (2006.01) |
| ***E02F 9/20*** | (2006.01) |
| ***F15B 13/02*** | (2006.01) |
| ***F15B 21/00*** | (2006.01) |

(52) U.S. Cl.

CPC .......... *E02F 9/2242* (2013.01); *E02F 9/2267* (2013.01); *E02F 9/2271* (2013.01); *E02F 9/2275* (2013.01); *E02F 9/2289* (2013.01); *E02F 9/2292* (2013.01); *F15B 13/024* (2013.01); *F15B 13/027* (2013.01); *F15B 21/00* (2013.01); *E02F 9/2296* (2013.01)

(56) References Cited

FOREIGN PATENT DOCUMENTS

| | | |
|---|---|---|
| JP | 2000-161312 A | 6/2000 |
| JP | 2015-48899 A | 3/2015 |

OTHER PUBLICATIONS

Japanese-language Written Opinion (PCT/ISA/237) issued in PCT Application No. PCT/JP2020/037923 dated Dec. 22, 2020 with English translation (three (3) pages).

International Preliminary Report on Patentability (PCT/IB/338 & PCT/IB/373) issued in PCT Application No. PCT/JP2020/037923 dated May 19, 2022, including English translation of document C2 (Japanese-language Written Opinion (PCT/ISA/237) filed on Feb. 23, 2022) (five (5) pages).

* cited by examiner

CONSTRUCTION MACHINE

TECHNICAL FIELD

The present invention relates to a construction machine configured such that a hydraulic actuator is driven by a hydraulic pump for a closed circuit.

BACKGROUND ART

In recent years, in construction machines such as hydraulic excavators and wheel loaders, energy saving has been an important development item. For energy saving of a construction machine, energy saving of a hydraulic system itself is important, and it has been examined to apply a hydraulic closed circuit system in which a hydraulic actuator is connected in a closed circuit manner to and directly controlled by a hydraulic pump. This system does not suffer from pressure loss by a control valve and does not suffer from flow rate loss either because the pump delivers hydraulic fluid only of a required flow rate. Also, it is possible for the system to regenerate positional energy of the actuator and energy upon deceleration. Therefore, energy saving is possible.

As a background art of a construction machine that includes a hydraulic closed circuit combined therein, a configuration is described in Patent Document 1. In the configuration, a plurality of variable displacement hydraulic pumps are branched and connected to a plurality of hydraulic actuators via a solenoid switching valve so as to configure a closed circuit, to thereby make it possible to achieve a combined operation and a high-speed operation of the actuators.

PRIOR ART DOCUMENT

Patent Document

Patent Document 1: JP-2015-48899-A

SUMMARY OF THE INVENTION

Problem to be Solved by the Invention

In the hydraulic circuit disclosed in Patent Document 1, at the time of no-operation (the engine is operating) of the construction machine or at the time of traveling, it is necessary to control the pump delivery volume of the hydraulic pumps for a closed circuit to zero such that the flow rate is not delivered. This is because, at the time of no-operation or traveling, the solenoid switching valve that connects the hydraulic pumps for a closed circuit and the actuators to each other is in a closed state and, if the flow rate should be delivered, then the delivery pressure rises to a relief pressure. Consequently, the pumps are acted upon by a high load, and the reliability degrades. Further, since also the load to the engine increases, the energy saving performance of the construction machine deteriorates.

As the hydraulic pump for a closed circuit, a variable displacement swash plate hydraulic pump is commonly used, and in order to control the pump delivery volume to zero, it is necessary to control the tilting angle of the swash plate to zero. In the state in which the tilting angle is zero, the piston in the pump is little displaced with respect to the cylinder and is pressed against a cylinder wall surface by the centrifugal force of the piston itself. Therefore, if this state continues, then there is the possibility that an oil film at a sliding portion may be broken to cause abrasion of or damage to the piston or the cylinder, resulting in decrease of the reliability. Especially in such a hydraulic pump for a closed circuit of a large delivery volume as is used in a large construction machine, since the piston is heavy and besides long term reliability is also demanded, the foregoing is a big problem.

The present invention has been made in view of the problem described above, and it is an object of the present invention to provide a construction machine configured such that a hydraulic actuator is driven by a hydraulic pump for a closed circuit, by which oil film breakage of the hydraulic pump for a closed circuit at the time of no-operation or traveling is prevented to improve the reliability and a high operation rate can be obtained.

Means for Solving the Problem

In order to attain the object described above, the present invention provides a construction machine comprising a closed circuit pump consisting of a bidirectionally tiltable hydraulic pump having two suction/delivery ports, a hydraulic actuator connected in a closed circuit manner to the closed circuit pump, a charge pump, a charge line connected to a delivery port of the charge pump, a check valve that is provided in a hydraulic line connecting the charge line and the closed circuit pump to each other and permits hydraulic operating fluid to flow from the charge line into the closed circuit pump, a charge relief valve provided in the charge line, an operation lever for instructing an operation of the hydraulic actuator, and a controller that controls a delivery volume of the closed circuit pump according to an input from the operation lever. The construction machine comprises a switching valve that is provided in a hydraulic line connecting one of delivery ports of the closed circuit pump and the charge line to each other and is opened and closed according to a control signal from the controller. The controller is configured to, in a case where a state in which the delivery volume of the closed circuit pump is kept to zero continues for a predetermined time period or more, open the switching valve and keep the delivery volume of the closed circuit pump to a predetermined delivery volume or more, the predetermined delivery volume being greater than zero.

According to the present invention configured in such a manner as described above, in a case where a state in which a tilting amount of the closed circuit pump is zero continues for a predetermined time period or more, keeping the tilting amount of the closed circuit pump to a predetermined tilting amount that is equal to or greater than zero causes a piston in the closed circuit pump to be displaced with respect to a cylinder. Therefore, oil is introduced to a sliding portion between the piston and the cylinder to thereby assure an oil film, and consequently, abrasion of the piston or the cylinder can be prevented. Further, by establishing communication of the delivery port of the closed circuit pump with the charge line via the switching valve, it is possible to suppress a delivery pressure of the closed circuit pump to a low level equal to or lower than a charge pressure. Consequently, it is possible to prevent deterioration in fuel consumption and improve durability of the closed circuit pump.

Advantages of the Invention

According to the present invention, provided is a construction machine configured such that a hydraulic actuator is driven by a hydraulic pump for a closed circuit, by which oil film breakage of the hydraulic pump for a closed circuit at the time of no-operation or traveling is prevented to improve the reliability and a high operation rate can be obtained.

MODE FOR CARRYING OUT THE INVENTION

Figure 1:
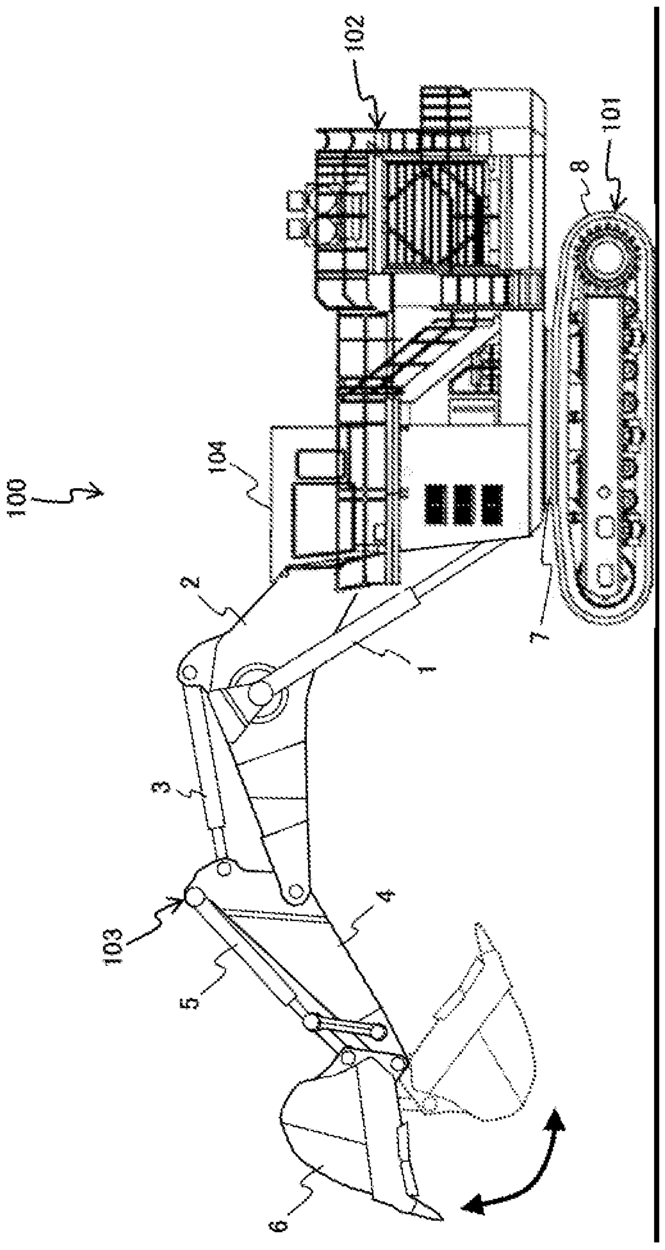
FIG. 1 is a side elevational view of a hydraulic excavator according to an embodiment of the present invention.

In the following, a construction machine according to an embodiment of the present invention is described with reference to the drawings, taking a hydraulic excavator as an example. It is to be noted that, in the figures, equivalent members are denoted by the same reference character, and overlapping description of them is suitably omitted.

FIG. 1 is a side elevational view of a hydraulic excavator according to the present embodiment.

Referring to FIG. 1, the hydraulic excavator 100 includes a lower track structure 101 having crawler type track devices 8 on the opposite left and right sides thereof, and an upper swing structure 102 mounted swingably on the lower track structure 101 through a swing device 7. The swing device 7 is driven by a swinging hydraulic motor (not depicted).

To the front side of the upper swing structure 102, a front implement 103 for performing excavation work and so forth is mounted. The front implement 103 includes a boom 2 coupled pivotably in the upward and downward direction to the front side of the upper swing structure 102, an arm 4 coupled pivotably in the upward and downward direction and in the forward and rearward direction to a distal end portion of the boom 2, and a bucket 6 coupled pivotably in the upward and downward direction and in the forward and rearward direction to a distal end portion of the arm 4. The boom 2, the arm 4, and the bucket 6 are driven by a boom cylinder 1, an arm cylinder 3, and a bucket cylinder 5, respectively, which are single rod type hydraulic cylinders.

A cab 104 in which an operator is to board is provided on the upper swing structure 102. In the cab 104, an operation lever 56*a* (depicted in FIG. 2) for issuing an instruction for operation of the arm 4 and the upper swing structure 102, an operation lever 56*d* (depicted in FIG. 2) for issuing an instruction for operation of the boom 2 and the bucket 6, and so forth are arranged.

Figure 2:
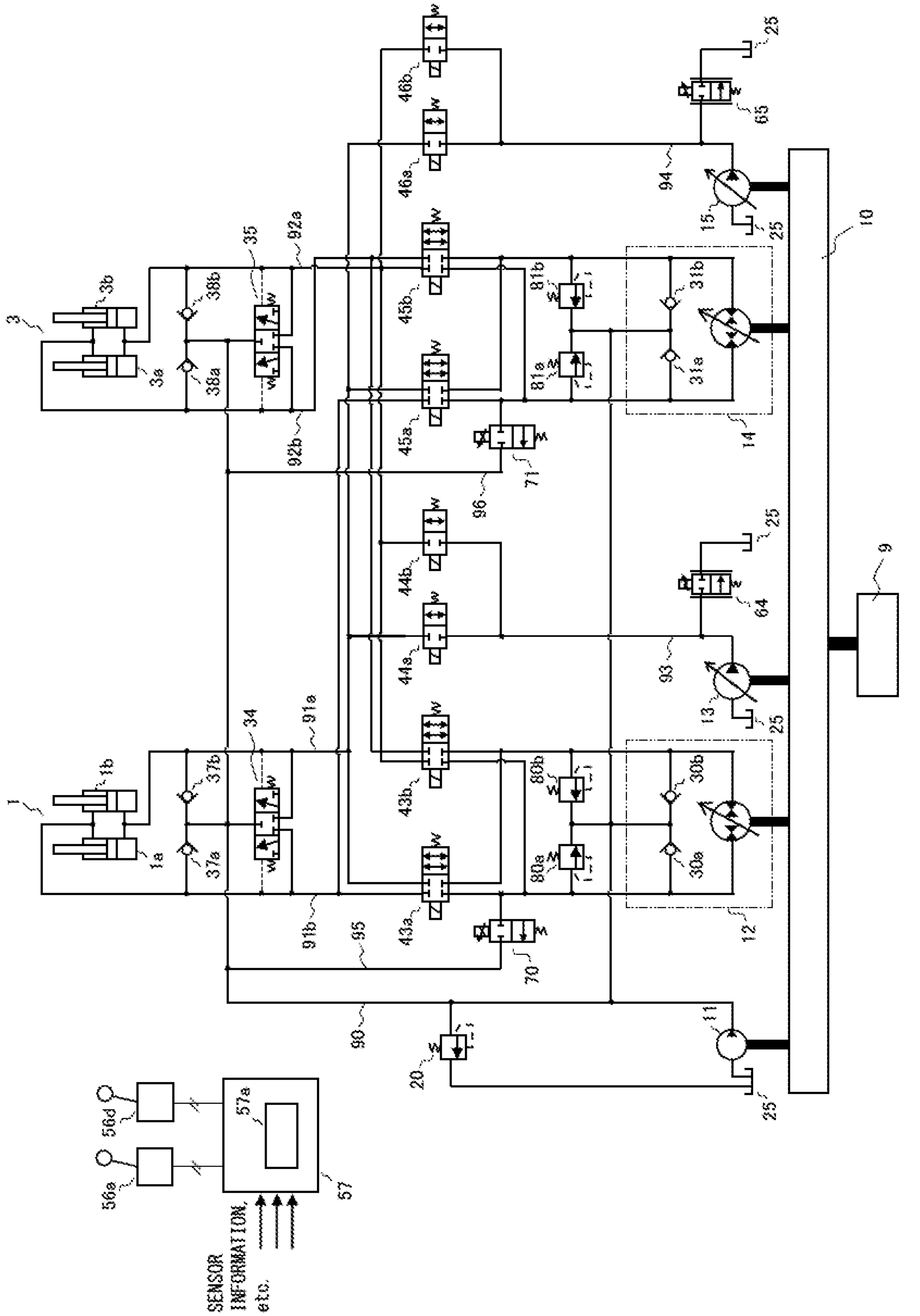
FIG. 2 is a hydraulic circuit diagram of the hydraulic excavator according to the embodiment of the present invention.

FIG. 2 is a hydraulic circuit diagram of the hydraulic excavator 100. It is to be noted that, in FIG. 2, only elements related to driving of the boom cylinder 1 and the arm cylinder 3 are depicted while elements related to driving of the other actuators are omitted.

Referring to FIG. 2, an engine 9 that is a power source is connected to a power transmission device 10 that distributes power. To the power transmission device 10, a charge pump 11 formed from a fixed displacement hydraulic pump, closed circuit pumps 12 and 14 each formed from a bidirectionally tiltable variable displacement hydraulic pump, and open circuit pumps 13 and 15 each formed from a unidirectionally tiltable variable displacement hydraulic pump are connected.

The charge pump 11 is connected at a suction port thereof to a tank 25 and at a delivery port thereof to a charge line 90. The charge line 90 is connected to the tank 25 via a charge relief valve 20. The charge relief valve 20 holds a delivery pressure of the charge pump 11 (pressure of the charge line 90) to a substantially fixed low pressure.

The closed circuit pump 12 is connected at one of suction/delivery ports thereof to a bottom side hydraulic chamber 1*a* of the boom cylinder 1 via a switching valve 43*a* and through a bottom side hydraulic line 91*a*, and at the other of the suction/delivery ports thereof to a rod side hydraulic chamber 1*b* of the boom cylinder 1 via the switching valve 43*a* and through a rod side hydraulic line 91*b*. The switching valve 43*a* switches the flow line between conduction and interruption in accordance with a signal supplied from a controller 57, and is in the interruption state when no signal is supplied. The closed circuit pump 12 is connected in a closed circuit manner to the boom cylinder 1 when the switching valve 43*a* is placed into the conduction state.

Further, the closed circuit pump 12 is connected at one of the suction/delivery ports thereof to a bottom side hydraulic chamber 3*a* of the arm cylinder 3 via a switching valve 43*b* and through a bottom side hydraulic line 92*a*, and at the other of the suction/delivery ports thereof to a rod side hydraulic chamber 3*b* of the arm cylinder 3 via the switching valve 43*b* and through a rod side hydraulic line 92*b*. The switching valve 43*b* switches the flow line between conduction and interruption in accordance with a signal supplied from the controller 57, and is in the interruption state when no signal is supplied. The closed circuit pump 12 is connected in a closed circuit manner to the arm cylinder 3 when the switching valve 43*b* is placed into the conduction state.

The closed circuit pump 14 is connected at one of suction/delivery ports thereof to the bottom side hydraulic chamber 1*a* of the boom cylinder 1 via a switching valve 45*a* and through the bottom side hydraulic line 91*a*, and at the other of the suction/delivery ports thereof to the rod side hydraulic chamber 1*b* of the boom cylinder 1 via the switching valve 45*a* and through the rod side hydraulic line 91*b*. The switching valve 45*a* switches the flow line between conduction and interruption in accordance with a signal supplied from the controller 57, and is in the interruption state when no signal is supplied. The closed circuit pump 14 is connected in a closed circuit manner to the boom cylinder 1 when the switching valve 45*a* is placed into the conduction state.

The closed circuit pump 14 is connected at one of the suction/delivery ports thereof to the bottom side hydraulic chamber 3*a* of the arm cylinder 3 via a switching valve 45*b* and through the bottom side hydraulic line 92*a*, and at the other of the suction/delivery ports thereof to the rod side hydraulic chamber 3*b* of the arm cylinder 3 via the switching valve 45*b* and through the rod side hydraulic line 92*b*. The switching valve 45*b* switches the flow line between conduction and interruption in accordance with a signal supplied from the controller 57, and is in the interruption state when no signal is supplied. The closed circuit pump 14 is connected in a closed circuit manner to the arm cylinder 3 when the switching valve 45*b* is placed into the conduction state.

The open circuit pump 13 is connected at a suction port thereof to the tank 25 and at a delivery port thereof to a delivery hydraulic line 93. The delivery hydraulic line 93 is connected to the tank 25 via a bleed-off valve 64. The bleed-off valve 64 changes its opening area in accordance with a signal supplied from the controller 57, and is in a fully open state when no signal is supplied. Further, the delivery hydraulic line 93 is connected to the bottom side hydraulic line 91*a* of the boom cylinder 1 via a switching valve 44*a* and is connected to the bottom side hydraulic line 92*a* of the arm cylinder 3 via a switching valve 44*b*. The switching valves 44*a* and 44*b* switch the flow line between conduction and interruption in accordance with a signal supplied from the controller 57, and are in the interruption state when no signal is supplied.

The open circuit pump 15 is connected at a suction port thereof to the tank 25 and at a delivery port thereof to a delivery hydraulic line 94. The delivery hydraulic line 94 is connected to the tank 25 via a bleed-off valve 65. The bleed-off valve 65 changes its opening area in accordance with a signal supplied from the controller 57, and is in a fully open state when no signal is supplied. Further, the delivery hydraulic line 94 is connected to the bottom side hydraulic line 91*a* of the boom cylinder 1 via a switching valve 46*a* and is connected to the bottom side hydraulic line 92*a* of the arm cylinder 3 via a switching valve 46*b*. The switching valves 46*a* and 46*b* switch the flow line between conduction and interruption in accordance with a signal supplied from the controller 57, and are in the interruption state when no signal is supplied.

The closed circuit pump 12 is connected at one of the suction/delivery ports thereof (on the side connected to the rod side hydraulic chamber 1*b* of the boom cylinder 1 and also to the bottom side hydraulic chamber 3*a* of the arm cylinder 3) to the charge line 90 through a branch hydraulic line 95, and a switching valve 70 is provided in the branch hydraulic line 95. Further, the closed circuit pump 14 is connected at one of the suction/delivery ports thereof (on the side connected to the rod side hydraulic chamber 1*b* of the boom cylinder 1 and also to the bottom side hydraulic chamber 3*a* of the arm cylinder 3) to the charge line 90 through a branch hydraulic line 96, and a switching valve 71 is provided in the branch hydraulic line 96. The switching valves 70 and 71 switch the flow line between conduction and interruption in accordance with a signal supplied from the controller 57, and are in the interruption state when no signal is supplied.

The bottom side hydraulic line 91*a* and the rod side hydraulic line 91*b* of the boom cylinder 1 are connected to the charge line 90 via check valves 37*a* and 37*b* and a flushing valve 34, and the bottom side hydraulic line 92*a* and the rod side hydraulic line 92*b* of the arm cylinder 3 are connected to the charge line 90 via check valves 38*a* and 38*b* and a flushing valve 35. The closed circuit pump 12 is connected at the suction/delivery ports thereof to the charge line 90 via check valves 30*a* and 30*b* and main relief valves 80*a* and 80*b*, and the closed circuit pump 14 is connected at the suction/delivery ports thereof to the charge line 90 via check valves 31*a* and 31*b* and main relief valves 81*a* and 81*b*. The check valves 30*a* and 30*b* are built in the closed circuit pump 12, and the check valves 31*a* and 31*b* are built in the closed circuit pump 14.

Each of the check valves 30*a*, 30*b*, 31*a*, 31*b*, 37*a*, 37*b*, 38*a*, and 38*b* sucks, when the pressure in the closed circuit decreases, hydraulic operating fluid from the charge line 90 into the circuit to thereby prevent cavitation of the circuit. The flushing valves 34 and 35 are low pressure selecting valves that connect the low pressure side of the closed circuit and the charge line 90 to each other, and keep the balance in hydraulic fluid amount in the closed circuit by discharging surplus hydraulic operating fluid in the closed circuit to the charge line 90 or by sucking hydraulic operating fluid lacking in the closed circuit from the charge line 90. Each of the main relief valves 80*a*, 80*b*, 81*a*, and 81*b* relieves, when the pressure in the closed circuit exceeds a predetermined pressure (main relief pressure), hydraulic operating fluid to the tank 25, to thereby protect the circuit.

The controller 57 issues a command to the pumps 12 to 15 and the switching valves 43*a* to 46*b*, 70, and 71 in response to an input from the operation lever 56*a* or 56*d* and sensor information such as the engine speed and the pressures to the individual portions. Further, the controller 57 includes an unload controlling section 57*a* for performing unload control to be hereinafter described. The unload controlling section 57*a* is implemented, for example, as one function of a program executed by the controller 57.

Figure 3:
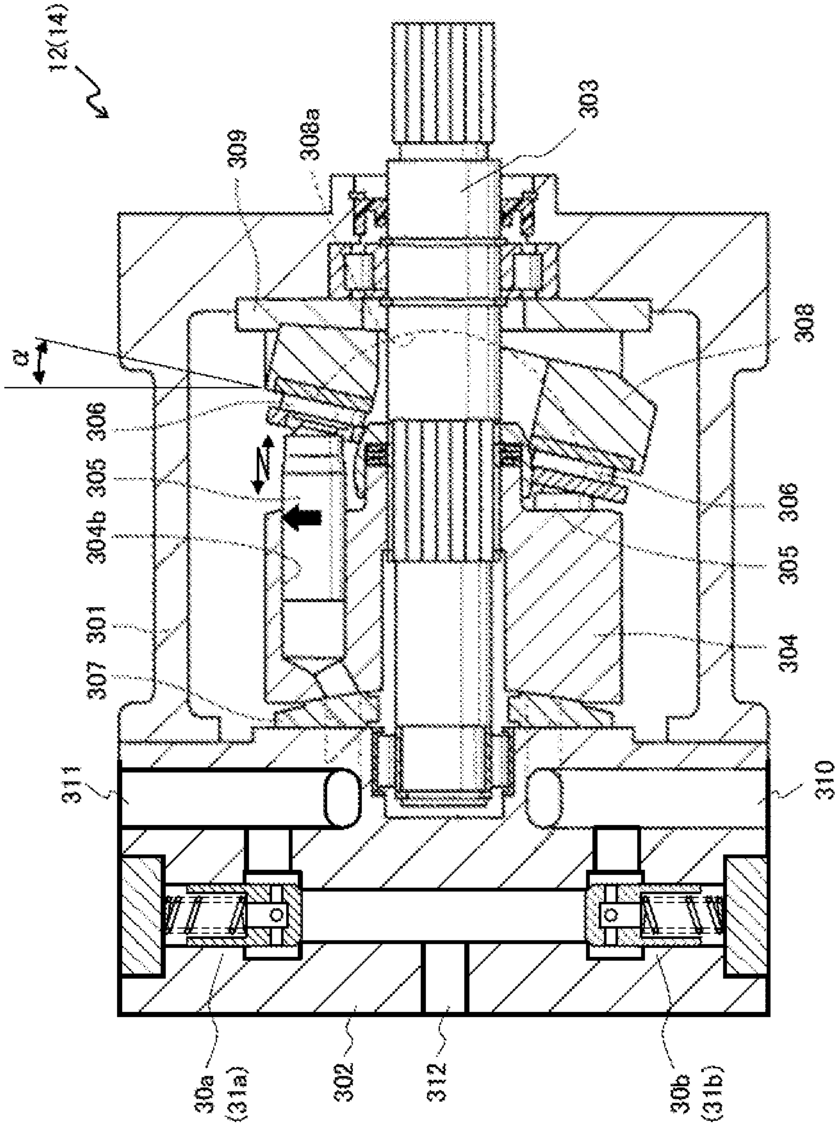
FIG. 3 is a cross sectional view of a closed circuit pump.

FIG. 3 is a cross sectional view of the closed circuit pump 12 (14).

Referring to FIG. 3, the closed circuit pump 12 (14) includes a casing 301, a rear case 302, a shaft 303, a cylinder 304, pistons 305, shoes 306, a valve plate 307, a swash plate 308, a cradle 309, suction/delivery ports 310 and 311, a charge port 312, and check valves 30*a* (31*a*) and 30*b* (31*b*).

Rotational power from the engine 9 is inputted to the shaft 303, and the cylinder 304, the plurality of pistons 305 accommodated in the cylinder 304, and so forth operate rotationally together with the shaft 303. The pistons 305 slidably rotate in contact with the swash plate 308. Since the swash plate 308 has an angle α, the pistons 305 are displaced in an axial direction with respect to the cylinder 304. For example, the pistons 305 suck hydraulic operating fluid from the suction/delivery port 310 and delivers the hydraulic operating fluid to the suction/delivery port 311.

The swash plate 308 is provided tiltably through the cradle 309 in the casing 301. The front surface side of the swash plate 308 forms a smooth surface 308*a* that guides the shoes 306 slidably. In contrast, the rear surface side of the swash plate 308 is supported tiltably (slidably) on the cradle 309. The cradle 309 is provided fixedly on the casing 301 and positioned around the shaft 303.

The tilting angle α of the swash plate 308 can be adjusted by a regulator and a servo piston which are not depicted. When the tilting angle α is zero, the pump delivery flow rate is zero, and when the tilting angle α has a negative value, the hydraulic operating fluid is sucked from the suction/delivery port 311 and is delivered to the suction/delivery port 310.

The charge line 90 is connected to the charge port 312. If the pressure in the suction/delivery ports 310 and 311 becomes equal to or lower than a charge pressure, then the check valves 30*a* and 30*b* (check valves 31*a* and 31*b*) are opened, and the hydraulic operating fluid from the charge pump 11 is sucked, to thereby prevent cavitation in the closed circuit pump 12 (14).

An example of operation of the actuators in the configuration described above is described first.

Referring to FIG. 2, when an extension operation of the boom cylinder 1 is to be performed, the switching valves 43*a* and 44*a* are placed into a conduction state, and the hydraulic operating fluid is delivered from the closed circuit pump 12 and the open circuit pump 13. Consequently, a flow rate corresponding to the two pumps is fed into the bottom side hydraulic chamber 1*a* of the boom cylinder 1, and so that the boom cylinder 1 extends. Although the discharge flow rate from the rod side hydraulic chamber 1*b* of the boom cylinder 1 is sucked into the closed circuit pump 12, when the flow rate becomes surplus, the hydraulic operating fluid is discharged from the flushing valve 34 to the charge line 90, but when the flow rate becomes insufficient, the hydraulic operating fluid is sucked conversely from the charge line 90 into the closed circuit via the flushing valve 34 or the check valves 30*a* and 37*a*.

When a pull-in operation of the arm cylinder 3 is to be performed, the switching valves 43*b* and 44*b* are placed into a conduction state, the hydraulic operating fluid is delivered from the closed circuit pump 12 in a direction opposite to that in the case described above, and the bleed-off valve 64 is opened. Consequently, the hydraulic operating fluid is discharged from the bottom side hydraulic chamber 3*a* of the arm cylinder 3, so that the arm cylinder 3 performs a pull-in operation.

When there is no lever input from the operator at the time of waiting for work or the like, all of the switching valves 43*a* to 46*b* are placed into an interruption state, and even in a case where the front implement 103 of the hydraulic excavator 100 is in the air as depicted in FIG. 1, the front implement 103 is held by the actuators 1 and 3 such that it does not move down in the direction of the own weight. The closed circuit pumps 12 and 14 have a tilting angle controlled to zero such that no delivery flow rate occurs.

In this case, as depicted in FIG. 3, the pistons 305 in each of the closed circuit pumps 12 and 14 are pressed against a cylinder wall surface 304*b* by a centrifugal force, the tilting angle $\alpha$ is zero, and the pistons 305 and the cylinder 304 do not have relative displacement therebetween. Therefore, the hydraulic operating fluid as lubricating oil is less likely to be introduced into a contact portion between the pistons 305 and the cylinder 304. Therefore, there is the possibility that, if this state continues, then the oil film at the contact portion may be broken to cause abrasion between or damage to the pistons 305 and the cylinder 304, resulting in deterioration of the reliability.

Therefore, in the present embodiment, in order to solve the problem described above, the switching valves 70 and 71 are provided in the branch hydraulic lines 95 and 96, respectively, and the unload controlling section 57*a* is provided in the controller 57.

Figure 4:
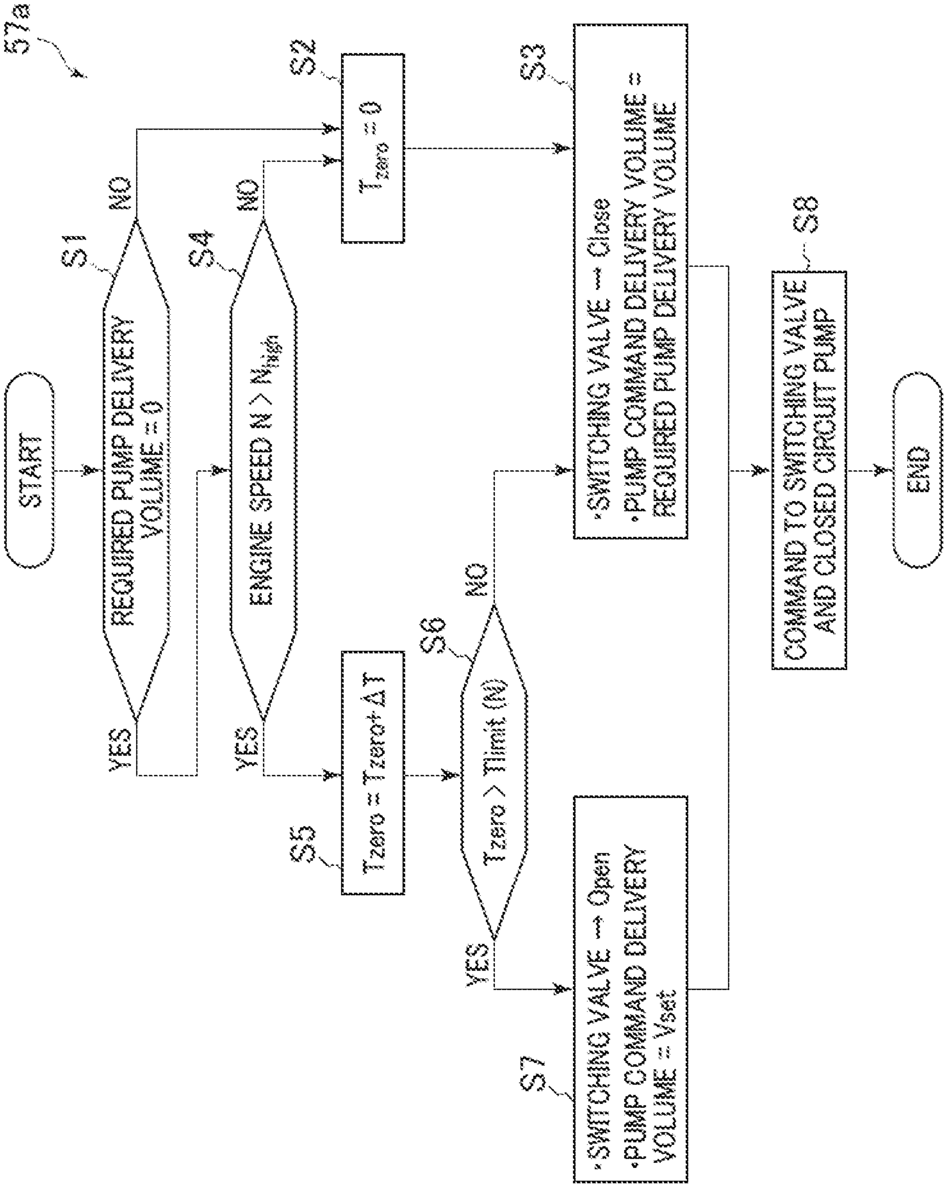
FIG. 4 is a flow chart depicting a process of an unload controlling section of a controller.

FIG. 4 is a flow chart of the unload controlling section 57*a*. Although unload control of the closed circuit pump 12 is described here, the description similarly applies also to the closed circuit pump 14.

The controller 57 first decides whether or not the required pump delivery volume to the closed circuit pump 12 is zero (step S1).

When it is decided in step S1 that the required pump delivery volume is not zero (No), the pistons 305 are in a state displaced with respect to the cylinder 304, and the pistons 305 and the cylinder 304 are not to be abraded. Therefore, the state of the pump delivery volume being zero is continued. In particular, the controller 57 sets a zero tilt duration Tzero to zero (step S2), and while keeping the command for the switching valve 70 to interruption (Close), the controller 57 applies the required delivery volume to the command delivery volume for the closed circuit pump 12 (step S3).

When it is decided in step S1 that the required pump delivery volume is zero (Yes), the controller 57 decides whether or not the engine speed N exceeds a predetermined rotation speed Nhigh (step S4).

When it is decided No (the engine speed N is equal to or lower than the predetermined rotation speed Nhigh) in step S4, since the centrifugal force acting upon the piston 305 of the closed circuit pump 12 is small and the possibility that the pistons 305 or the cylinder 304 may be abraded is sufficiently low, the state of the pump delivery volume being zero is continued as it is. In particular, the controller 57 sets the zero tilt duration Tzero to zero (step S2), and while keeping the command for the switching valve 70 to interruption (Close), the controller 57 applies the required delivery volume to the command delivery volume for the closed circuit pump 12 (step S3).

When it is decided Yes (the engine speed N exceeds the predetermined rotation speed Nhigh) in step S4, the controller 57 adds a control cycle $\Delta T$ to the zero tilt duration Tzero in the preceding control cycle to calculate the zero tilt duration Tzero at the present point of time (step S5).

Figure 5:
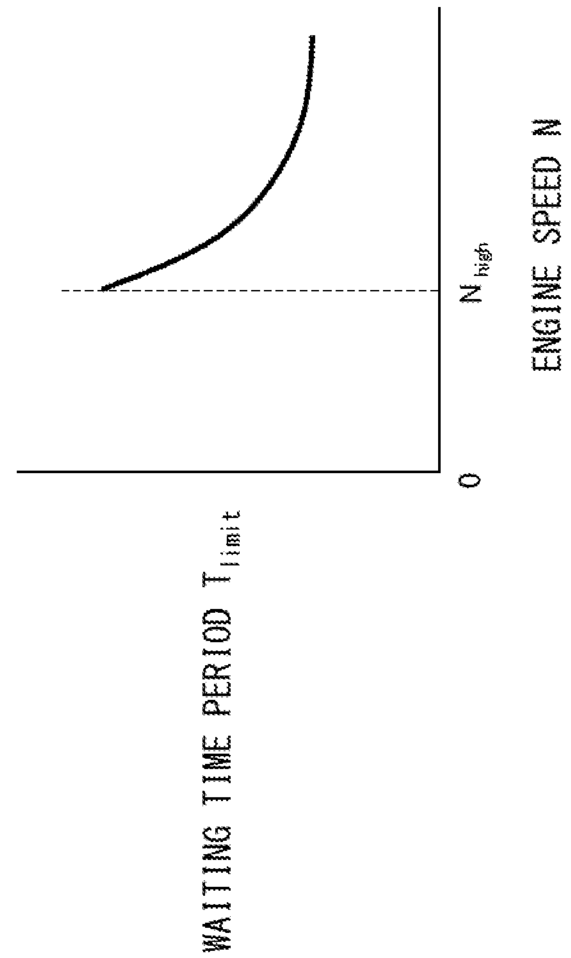
FIG. 5 is a view indicating a correlation between a waiting time period and an engine speed.

Subsequently to step S5, the controller 57 decides whether or not the zero tilt duration Tzero exceeds a predetermined waiting time period Tlimit (step S6). In the present embodiment, the waiting time period Tlimit is defined as a function of the engine speed N and is set such that it decreases as the engine speed N increases with respect to the predetermined rotation speed Nhigh as depicted in FIG. 5. This is because, as the engine speed N increases, the centrifugal force acting upon the piston 305 of the closed circuit pump increases and the time period until the oil film at the sliding portion between the pistons 305 and the cylinder 304 is broken decreases.

When the controller 57 decides No (the zero tilt duration Tzero is equal to or shorter than the predetermined waiting time period Tlimit) in step S6, it continues the state of the pump delivery volume being zero. In other words, while keeping the command for the switching valve 70 to interruption (Close), the controller 57 applies the required delivery volume to the command delivery volume for the closed circuit pump 12 (step S3).

When the controller 57 decides YES (the zero tilt duration Tzero exceeds the waiting time period Tlimit) in step S6, it sets the command to the switching valve 70 to open (Open) and sets the command delivery volume for the closed circuit pump 12 to a predetermined delivery volume Vset (step S7).

Subsequently to step S3 or step S7, the controller 57 outputs a command to the switching valve 70 and the closed circuit pump 12 (step S8), thereby ending the flow.

Figure 6:
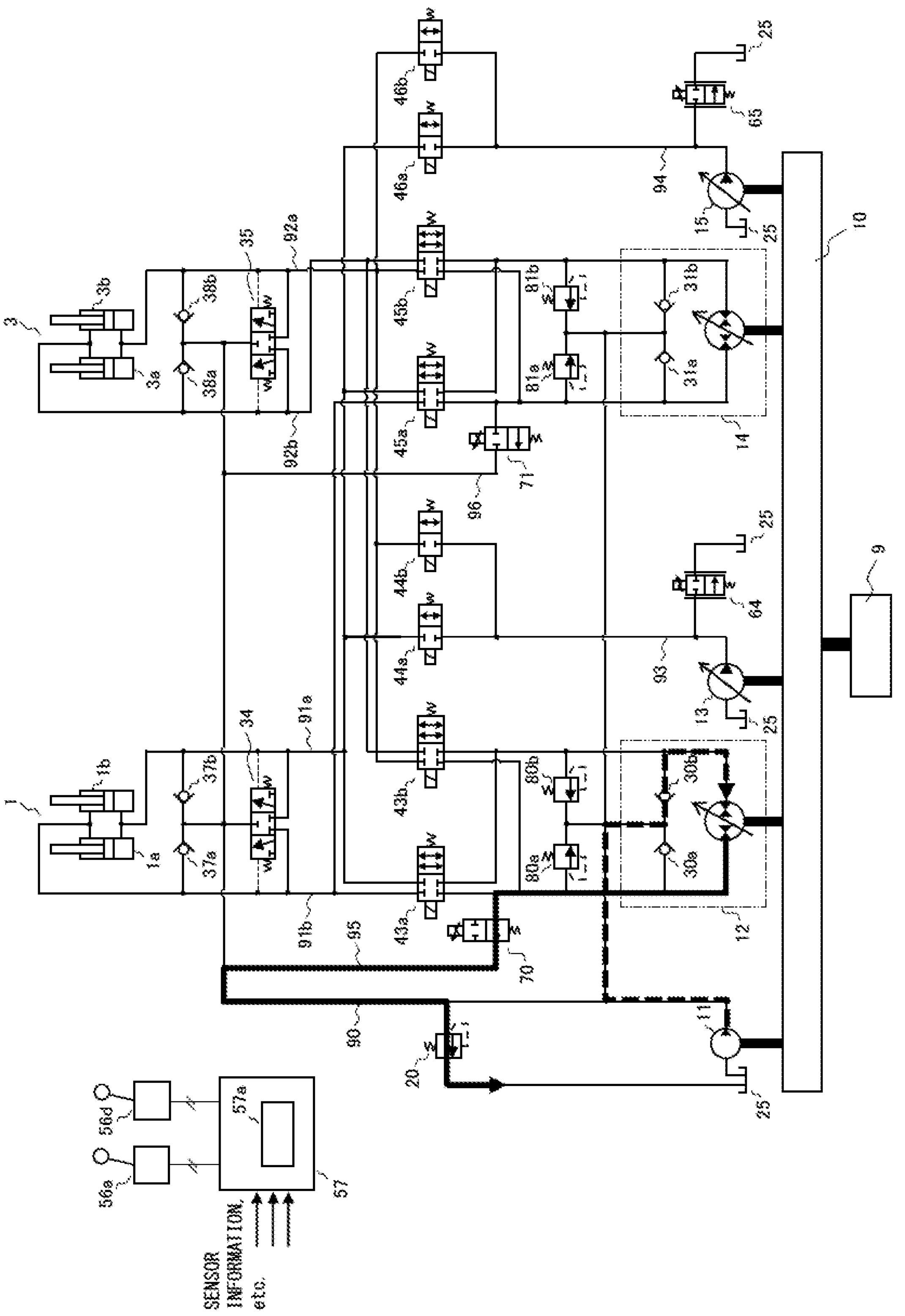
FIG. 6 is a hydraulic circuit diagram depicting flows of hydraulic operating fluid when the engine speed exceeds a predetermined rotation speed and besides a zero-tilt duration exceeds a waiting time period.

FIG. 6 depicts flows of the hydraulic operating fluid when the engine speed N exceeds the predetermine rotation speed Nhigh and the zero tilt duration Tzero of the closed circuit pump 12 exceeds the waiting time period Tlimit. The closed circuit pump 12 delivers a flow rate according to the delivery volume Vset. The hydraulic operating fluid delivered from the closed circuit pump 12 flows to the charge line 90 via the switching valve 70 and returns to the tank 25 via the charge relief valve 20 as indicated by a thick solid line in FIG. 6. To the suction side of the closed circuit pump 12, the delivery flow rate of the charge pump 11 is supplied via the check valve 30*b* as indicated by a thick broken line in FIG. 6.

As a result, the following advantageous effects are achieved.

Since the pistons 305 in the closed circuit pump 12 are displaced with respect to the cylinder 304 with the closed circuit pump delivery volume kept to a level equal to or higher than the predetermined delivery volume Vset, the hydraulic fluid is introduced to the sliding portion to thereby assure an oil film, by which abrasion can be prevented. Further, since the suction/delivery ports of the closed circuit pump 12 are connected to the charge line 90 via the switching valve 70, the delivery pressure of the closed circuit pump 12 is suppressed to a low level equal to or lower than the charge pressure. Consequently, degradation of fuel consumption can be prevented, and the durability of the closed circuit pump 12 itself can be improved.

Further, since the waiting time period Tlimit until unload control is started is provided and the waiting time period Tlimit is changed according to the rotation speed N, for example, in such a case where the probability of abrasion is low as upon engine idling, the waiting time period Tlimit is set to infinity such that unload control is not performed. Since this results in significant reduction in the number of times of operation of the switching valves 70 and 71, the reliability of the switching valves 70 and 71 can be assured readily.

Further, as depicted in FIG. 6, the present embodiment adopts a configuration in which, out of the pieces of hydraulic equipment connected to the charge line 90, the check valves 30*a*, 30*b*, 31*a*, and 31*b* are arranged nearest from the delivery port of the charge pump 11 while the charge relief valve 20 and the switching valves 70 and 71 are arranged farther than them. Consequently, since, during unload control, hydraulic operating fluid of a comparatively low temperature in the tank 25 is sucked into the closed circuit pumps 12 and 14 via the charge pump 11, temperature rise of the closed circuit pumps 12 and 14 is suppressed, and the reliability and the durability can be improved. If the charge relief valve 20, the check valves 30*a*, 30*b*, 31*a*, and 31*b*, and the switching valves 70 and 71 should be arranged in this order or the switching valves 70 and 71, the check valves 30*a*, 30*b*, 31*a*, and 31*b*, and the charge relief valve 20 should be arranged in this order from the nearest side to the delivery port of the charge pump 11, the hydraulic operating fluid delivered from the closed circuit pumps 12 and 14 is sucked back into the closed circuit pumps 12 and 14 via the switching valves 70 and 71 and the check valves 30*a*, 30*b*, 31*a*, and 31*b*. Therefore, since the hydraulic operating fluid is circulated without passing the tank 25, there is the possibility that the temperature of the hydraulic operating fluid may rise locally and the viscosity of the hydraulic operating fluid may decrease, resulting in promotion of abrasion of the sliding portion.

Figure 7:
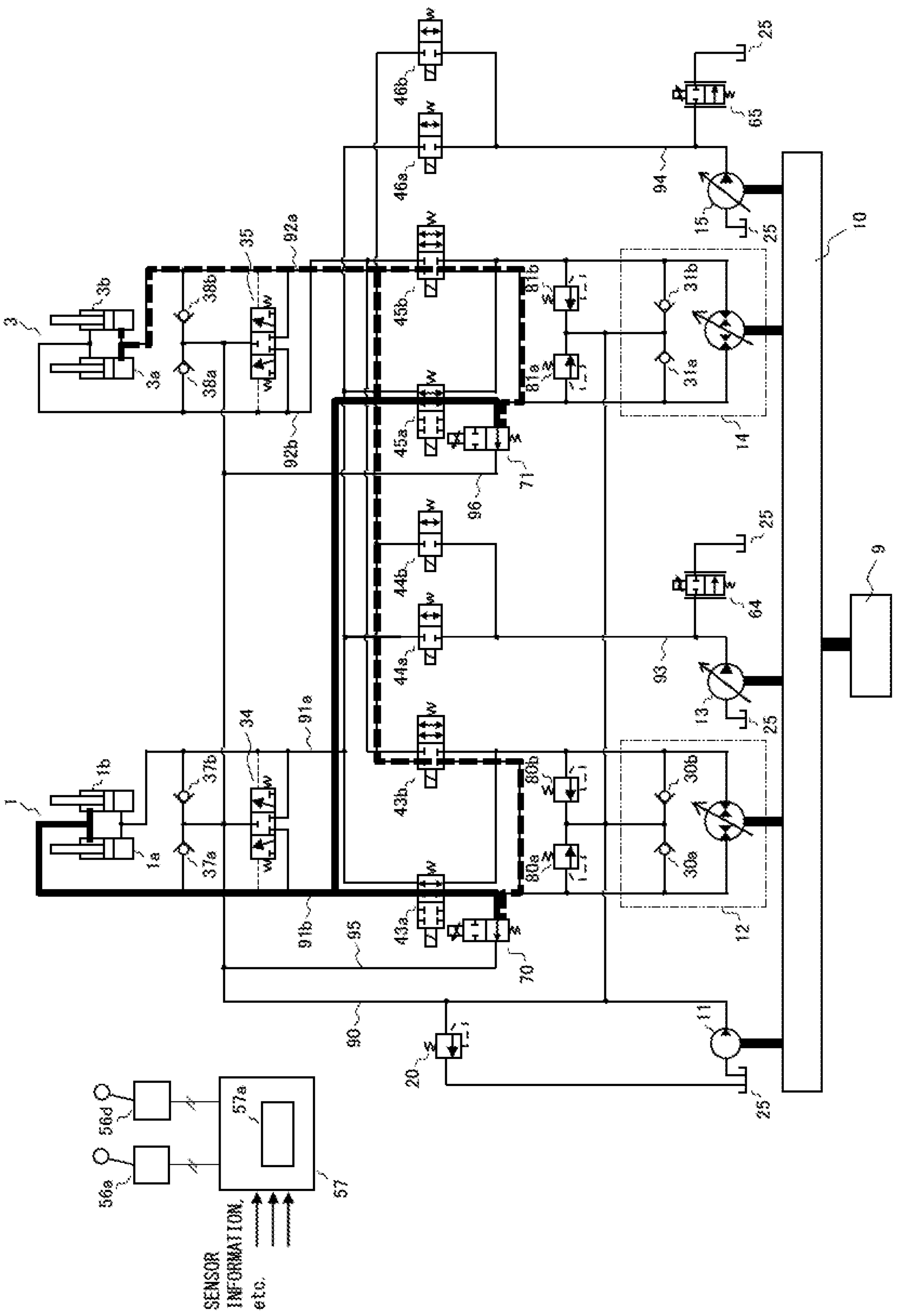
FIG. 7 is a hydraulic circuit diagram depicting a state in which a switching valve is stuck.

Further, the present embodiment adopts a configuration in which the switching valves 70 and 71 for unload control are connected to only either one of the bottom side hydraulic chambers 1*a* and 3*a* and the rod side hydraulic chambers 1*b* and 3*b* of the hydraulic cylinders 1 and 3 and are thus connected to the side on which a high pressure by the own weight of the front implement 103 does not act. In particular, in the present embodiment, as a frequently used aerial posture, such a scene as depicted in FIG. 1 is supposed in which the bucket 6 is driven to perform a warm-up operation. In this posture, since a high pressure by the own weight of the front implement 103 acts upon the bottom side of the boom cylinder 1 and the rod side of the arm cylinder 3, the present embodiment adopts a configuration in which the switching valves 70 and 71 are connected to the rod side of the boom cylinder 1 and the bottom side of the arm cylinder 3 upon which a high pressure does not act, as depicted in FIG. 7.

Consequently, even in a case in which the switching valve 70 is stuck open (stuck-open failure) at a point of time at which the operator intends to perform a very small boom-raising operation, for example, from the aerial posture of FIG. 1 and places the switching valve 43*a* into the conduction state, the boom 2 does not move down suddenly in the own weight direction. Therefore, a movement that is not intended by the operator can be suppressed.

In the present embodiment, provided is the hydraulic excavator 100 comprising the closed circuit pumps 12 and 14 each consisting of a bidirectionally tiltable hydraulic pump having two suction/delivery ports, the actuators 1 and 3 each connected in a closed circuit manner to the closed circuit pumps 12 and 14, the charge pump 11, the charge line 90 connected to the delivery port of the charge pump 11, the check valves 30*a*, 30*b*, 31*a*, and 31*b* that are provided in the hydraulic lines each connecting the charge line 90 and the closed circuit pump 12 or 14 to each other and permit the hydraulic operating fluid to flow from the charge line 90 into the closed circuit pumps 12 and 14, the charge relief valve 20 provided in the charge line 90, the operation levers 56*a* and 56*d* for instructing operations of the actuators 1 and 3, and the controller 57 that controls the delivery volumes of the closed circuit pumps 12 and 14 according to inputs from the operation levers 56*a* and 56*d*. The hydraulic excavator 100 includes the switching valves 70 and 71 that are provided in the branch hydraulic lines 95 and 96 each connecting one of the suction/delivery ports of the closed circuit pump 12 or 14 and the charge line 90 to each other and are opened and closed according to a control signal from the controller 57. The controller 57 is configured to, in a case where the state in which the delivery volumes of the closed circuit pumps 12 and 14 are kept to zero continues for the predetermined time period Tlimit or more, open the switching valves 70 and 71 and keep the delivery volumes of the closed circuit pumps 12 and 14 to the predetermined delivery volume Vset or more, the predetermined delivery volume being greater than zero.

According to the present embodiment configured in such a manner as described above, keeping the delivery volumes of the closed circuit pumps 12 and 14 equal to or greater than the predetermined delivery volume Vset causes the pistons 305 in each of the closed circuit pumps 12 and 14 to be displaced with respect to the cylinder 304, and therefore, oil is introduced into the sliding portion to thereby assure an oil film and can prevent abrasion. Further, connecting the delivery ports of the closed circuit pumps 12 and 14 to the charge line 90 via the switching valves 70 and 71 suppresses the pump pressure to a low level (to a pressure equal to or lower than the charge pressure), and therefore, it is possible to prevent deterioration in fuel consumption and improve the durability of the closed circuit pumps 12 and 14. As a result, in the construction machine configured such that a hydraulic actuator is driven by a hydraulic pump for a closed circuit, oil film breakage of the hydraulic pump for a closed circuit that is the most important equipment can be prevented. Therefore, it is possible to provide a construction machine in which the reliability of the closed circuit pump is improved and a high operation rate is achieved. It is to be noted that, while, in the present embodiment, the switching valves 70 and 71 are provided on the rod side of the boom cylinder 1 and the bottom side of the arm cylinder 3, the switching valves 70 and 71 may otherwise be provided on the bottom side of the boom cylinder 1 and the rod side of the arm cylinder 3.

Further, the controller 57 in the present embodiment is configured to set the predetermined time period Tlimit shorter as the rotation speed N of the closed circuit pumps 12 and 14 increases.

Consequently, since the waiting time period Tlimit until unload control is started changes according to the rotation speed N of the closed circuit pumps 12 and 14, in a case where the possibility of abrasion is low as upon engine idling, for example, the unload control is not performed. As a result, the number of times of operation of the switching valves 70 and 71 decreases, and therefore, assurance of the reliability of the switching valves 70 and 71 is facilitated.

Further, in the present embodiment, out of the check valves 30*a*, 30*b*, 31*a*, and 31*b*, the charge relief valve 20, and the switching valves 70 and 71 all connected to the charge line 90, the check valves 30*a*, 30*b*, 31*a*, and 31*b* are arranged nearest from the delivery port of the charge pump 11.

Consequently, since, during unload control, oil of a comparatively low temperature is sucked from the tank 25 into the closed circuit pumps 12 and 14 via the charge pump 11, temperature rise of the closed circuit pumps 12 and 14 is suppressed, and the reliability and the durability can be improved.

Further, the hydraulic excavator 100 according to the present embodiment comprises the front implement 103 including the boom 2 and the arm 4. The closed circuit pumps 12 and 14 include the first closed circuit pump 12 and the second closed circuit pump 14, and the actuators 1 and 3 include the boom cylinder 1 that drives the boom 2 and the arm cylinder 3 that drives the arm 4. The switching valves 70 and 71 include the first switching valve 70 provided in the first branch hydraulic line 95 that connects one of the suction/delivery ports of the first closed circuit pump 12 and the charge line 90 to each other, and the second switching valve 71 provided in the second branch hydraulic line 96 that connects one of the suction/delivery ports of the second closed circuit pump 14 and the charge line 90 to each other. Both the switching valve 70 and the switching valve 71 are arranged on the rod side of the boom cylinder 1 and the bottom side of the arm cylinder 3.

Consequently, even in a case where the switching valves 70 and 71 are stuck open (stuck-open failure), such a movement of the front implement 103 as to suddenly move down in its own weight direction can be prevented, and therefore, a motion not intended by the operator can be suppressed.

While the embodiment of the present invention has been described in detail, the present invention is not limited to the embodiment described above and includes various modifications. For example, the embodiment described above has been described in detail in order to explain the present invention in an easy-to-understand manner, and the present invention is not necessarily restricted to what includes all the configurations described hereinabove.

DESCRIPTION OF REFERENCE CHARACTERS

1: Boom cylinder (hydraulic actuator)
1*a*: Bottom side hydraulic chamber
1*b*: Rod side hydraulic chamber
2: Boom
3: Arm cylinder (hydraulic actuator)
3*a*: Bottom side hydraulic chamber
3*b*: Rod side hydraulic chamber
4: Arm
5: Bucket cylinder
6: Bucket
7: Swing device
8: Track device
9: Engine
10: Power transmission device
11: Charge pump
12: Closed circuit pump (first closed circuit pump)
14: Closed circuit pump (second closed circuit pump)
13, 15: Open circuit pump
20: Charge relief valve
25: Tank
34, 35: Flushing valve
30*a*, 30*b*, 31*a*, 31*b*, 37*a*, 37*b*, 38*a*, 38*b*: Check valve
43*a*, 43*b*, 44*a*, 44*b*, 45*a*, 45*b*, 46*a*, 46*b*: Switching valve
56*a*, 56*d*: Operation lever
57: Controller
57*a*: Unload controlling section
64, 65: Bleed-off valve
70: Switching valve (first switching valve)
71: Switching valve (second switching valve)
80*a*, 80*b*, 81*a*, 81*b*: Main relief valve
90: Charge line
91*a*: Bottom side hydraulic line
91*b*: Rod side hydraulic line
92*a*: Bottom side hydraulic line
92*b*: Rod side hydraulic line
93, 94: Delivery hydraulic line
95: Branch hydraulic line (first branch hydraulic line)
96: Branch hydraulic line (second branch hydraulic line)
100: Hydraulic excavator (construction machine)
101: Lower track structure
102: Upper swing structure
103: Front implement
104: Cab
301: Casing
302: Rear case
303: Shaft
304: Cylinder
304*a*: Cylinder wall surface
305: Piston
306: Shoe
307: Valve plate
308: Swash plate
308*a*: Smooth surface
309: Cradle
310, 311: Suction/delivery port
312: Charge port

The invention claimed is:

1. A construction machine comprising:

a closed circuit pump consisting of a bidirectionally tiltable hydraulic pump having two suction/delivery ports;

a hydraulic actuator connected in a closed circuit manner to the closed circuit pump;

a charge pump;

a charge line connected to a delivery port of the charge pump;

a check valve that is provided in a hydraulic line connecting the charge line and the closed circuit pump to each other and permits hydraulic operating fluid to flow from the charge line into the closed circuit pump;

a charge relief valve provided in the charge line;

an operation lever for instructing an operation of the hydraulic actuator; and a controller that controls a delivery volume of the closed circuit pump according to an input from the operation lever; wherein the construction machine includes a switching valve that is provided in a hydraulic line connecting one of the suction/delivery ports of the closed circuit pump and the charge line to each other and is opened and closed according to a control signal from the controller, and the controller is configured to, in a case where a state in which the delivery volume of the closed circuit pump is kept to zero continues for a predetermined time period or more, open the switching valve and keep the delivery volume of the closed circuit pump to a predetermined delivery volume or more, the predetermined delivery volume being greater than zero.

2. The construction machine according to claim 1, wherein the controller is configured to set the predetermined time period shorter as a rotation speed of the closed circuit pump increases.

3. The construction machine according to claim 1, wherein, out of the check valve, the charge relief valve, and the switching valve, the check valve is arranged nearest from the delivery port of the charge pump.

4. The construction machine according to claim 1, wherein the construction machine comprises a front implement including a boom and an arm, the closed circuit pump includes a first closed circuit pump and a second closed circuit pump, the hydraulic actuator includes a boom cylinder that drives the boom and an arm cylinder that drives the arm, the switching valve includes a first switching valve provided in a hydraulic line that connects one of suction/delivery ports of the first closed circuit pump and the charge line to each other, and a second switching valve provided in a hydraulic line that connects one of suction/delivery ports of the second closed circuit pump and the charge line to each other, and both the first switching valve and the second switching valve are arranged on a rod side of the boom cylinder and a bottom side of the arm cylinder.

* * * * *